Jan. 1, 1963    G. P. FELTS    3,071,033
CABLE CUTTER

Filed May 19, 1959    2 Sheets-Sheet 1

Gordon P. Felts,
INVENTOR.

BY
Robert M. McManigal
Attorney

Jan. 1, 1963  G. P. FELTS  3,071,033
CABLE CUTTER
Filed May 19, 1959  2 Sheets-Sheet 2
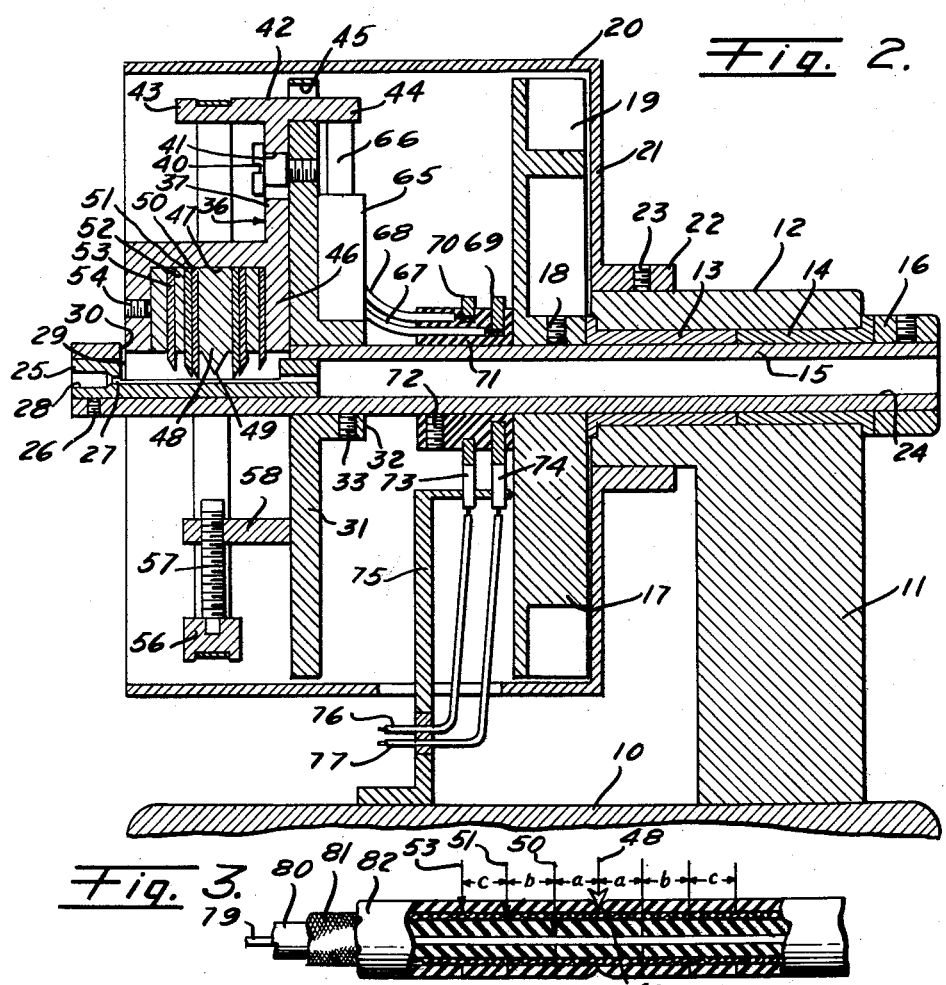
Fig. 2.
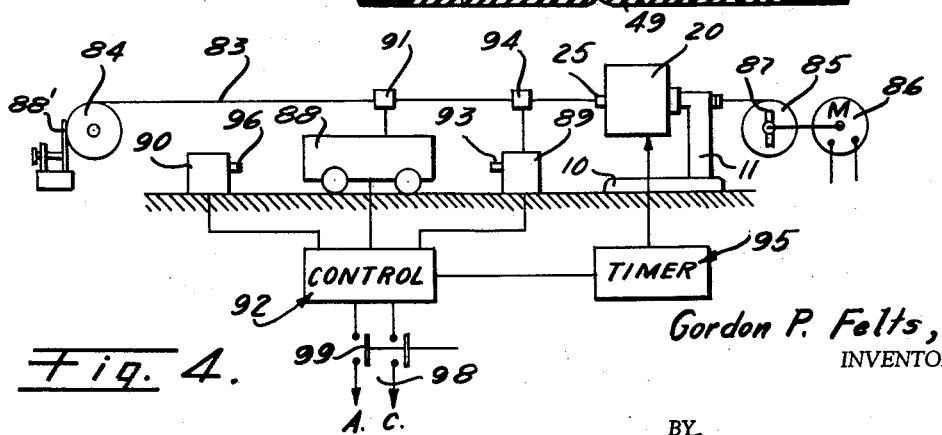
Fig. 3.
Fig. 4.
Gordon P. Felts,
INVENTOR.
BY Robert M. McManigal
Attorney

United States Patent Office 3,071,033
Patented Jan. 1, 1963

3,071,033
CABLE CUTTER
Gordon P. Felts, Palm Springs, Calif., assignor to Microdot Inc., South Pasadena, Calif., a corporation of California
Filed May 19, 1959, Ser. No. 814,341
9 Claims. (Cl. 82—76)

The present invention relates generally to apparatus for cutting filamentary materials, and is more particularly concerned with improved means for accurately measuring and cutting electrical conductors and cables with insulating covers thereon to desired lengths in such manner that the end portions of the insulation may be readily stripped to expose the conductors.

In its broad concept, the apparatus of the present invention is susceptible of general application, but for purposes of clarity has been illustrated and described herein with respect to the preparation of insulated electrical conductors, such for example as coaxial cables, for subsequent use by the assembler. More specifically, the apparatus is arranged to mark the outer surface or jacket of the cable at a point where the cable is to be ultimately cut for obtaining the desired measured lengths as indicated by the marks. Further, the apparatus is arranged to make cuts up to the central conductor, the inner dielectric, and outer conductor on both sides of the length marking, the cuts being spaced to predetermined dimensions. The cable is then wound on a reel from which it may be supplied to the assembler or other user as required, it then being necessary only to cut the cable at the length markings as needed. After the cable is thus manually severed, the previously cut portions, which now appear at the cable length ends, may be easily stripped by the assembler or other user so as to expose the conductors for connecting terminals or other fittings thereto.

With the foregoing in mind, it is one object of the herein described invention to provide cutter apparatus which will precut the outer conductor or conductors and insulation layers of a coaxial cable on opposite sides of a point where the central conductor may subsequently be severed, after which the cable is wound on a reel for storage until it is ready for use.

A further object of the invention is to provide cable cutting apparatus, wherein cutter blades are arranged for revolving around the cable, these blades being spring biased into a cutting position, and movable through mechanical or electrical means to non-cutting position.

In cable cutting apparatus of the above character, there are three major variables which must be changed in order to accommodate different sizes and types of coaxial cables. These variables may be stated as comprising:

(1) The speed at which the cutting blades are revolved.
(2) The pressure of the blades on the cables.
(3) The time required to make the cuts.

A further object therefore resides in the provision of means for controlling and regulating the above variables with a high degree of accuracy so as to permit use of the apparatus with miniature coaxial cable.

Another object is to provide novel mechanism for automatically feeding the cable, measuring the lengths into which the cable will be ultimately severed, and thereafter rewind the cable on a storage reel for future use.

It is also an object of the invention to provide novel control means for accomplishing the above objects.

Further objects of the invention will be brought out in the following part of the specification, wherein detailed description is for the purpose of fully disclosing the invention without placing limitations thereon.

Referring to the accompanying drawings, which are for illustrative purposes:

FIG. 2 is a vertical longitudinal section of the same, taken substantially on line 2—2 of FIG. 1;

FIG. 3 is an enlarged fragmentary view of a co-axial cable with cutaway portions to show its component parts, and diagrammatically illustrating the cutting positions according to the present invention;

FIG. 4 is a view diagrammatically illustrating the associated components for feeding the cable to the cutter, measuring the lengths into which the cable is to be severed, and interrelation of certain of the control mechanism.

Figure 1:
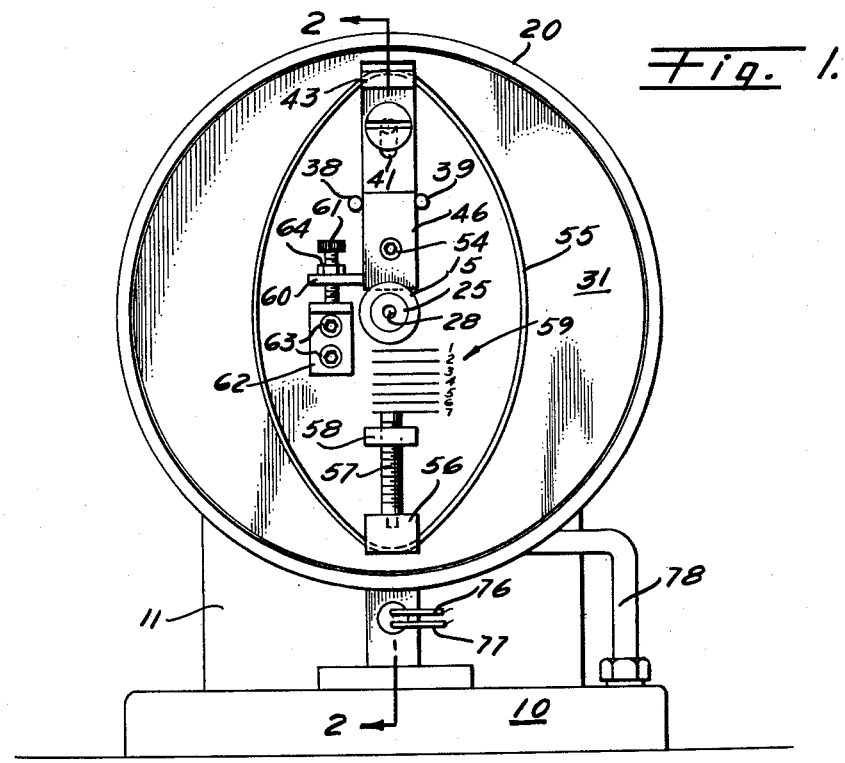
FIG. 1 is an end elevational view of cable cutter apparatus embodying the features of the herein described invention.

Referring now more specifically to the drawings, the cutter mechanism for illustrative purposes is shown in FIGS. 1 and 2 as comprising a base plate 10 which carries an upstanding support pedestal 11 for a bearing structure 12 at its uppermost end. This bearing structure is provided with tubular bearing inserts 13 and 14 which rotatably support a tubular shaft 15. The shaft is retained axially against movement in the bearing inserts by a retaining collar 16 at one end, and a rotor structure 17 which is secured to the shaft by a set screw 18 or other suitable means.

The rotor 17 carries peripherally arranged vanes 19 and is cooperatively associated with a surrounding casing 20 so as to provide an air actuated motor for rotating the shaft 15. The casing 20 is of cylindrical construction and has an end closure 21 overlying one end of the rotor 17 and provided with a central hub 22 which surrounds one end of the bearing structure 12 and is fixedly secured thereto as by a set screw 23 or other suitable means. The casing 20 is open at its other end and in general forms a housing for the cutting mechanism to be subsequently explained in detail.

As clearly shown in FIG. 2, the tubular shaft 15 has an axially extending passage 24 through which the filamentary material, in this case an electrical conductor such as a coaxial cable may be longitudinally guided and moved to and from the cutting mechanism. At the entrance end of the axial passage 24, that is the left end as viewed in FIG. 2, there is provided a removable tubular insert 25 which may be retained as by a set screw 26, or other suitable means. This insert is provided with an axially extending passage 27 having a diameter depending upon the size of the cable upon which the cutting operation is to be performed. The entrance end of the passage 27 may be enlarged, as indicated at 28, to facilitate entrance of the cable. Between the ends of the passage 27, the insert is cut out to provide a side opening 29 for passage of the cutting blades, this opening being of sufficient depth to extend into the passage 27 and thus expose a portion of the circumference of the cable jacket during its passage through the insert. In the mounted position of the insert 25, the side opening 29 thereof registers with an opening 30 provided in the adjacent wall of the tubular shaft 15.

Adjacent the innermost end of the opening 30, the shaft 15 has a transversely extending circular plate 31 secured thereto, this plate having a central hub 32 secured to the shaft by means of a set screw 33 or other means. From the hub 32, the plate comprises a radial partition in the casing 20 which supports the cutting mechanism, which will now be described.

The plate 31 carries a tool holder, as generally indicated at 36, which comprises a rear mounting plate 37 secured to the plate 31 for limited radial movement between lateral guid pins 38 and 39 (FIG. 1). The tool holder is detachably secured by means of a retaining screw 40 which extends through an elongate slot 41 in the mounting plate 37 and is in threaded engagement with the plate 31. The outer-most end of the mounting plate 37 is formed with a T-shaped head 42 having one end 43 which projects away from the plate 31, while the other end 44 extends through an opening 45 in the peripheral margin of the plate 31.

The lowermost end of the mounting plate 37 has an enlarged integrally formed cupped blade holder 46 which is provided with a recess 47 having an open side facing the adjacent opening 30 in the wall of the shaft 15. The recess 47 thus forms a socket in which the cutting blades are mounted. In the illustrated blade assembly, the blade arrangement comprises a central market blade 48 having a projecting point 49 adapted to score the outer jacket of the cable and thus indicate the point in which the cable may be severed to provide the required cable length. On the opposite sides of the marker blade, there is provided a pair of blades 50 and 51, the blade 50 having its cutting edge positioned to cut up to the inner conductor of the cable while the cutting blade 51 is arranged to cut through the conductor sheath to the inner surface of the insulation surrounding the innermost conductor of the cable. Spaced from the blade 51 by means of a spacer plate 52 is another cutting blade 53 having its cutting edge so positioned as to cut through the outer insulating jacket up to the outer surface of the conducting sheath of the cable. The entire blade assembly is retained within the socket or recess 47 by means of a retaining set screw 54 which permits the mounting of various blade assemblies to meet different cutting conditions for cables having different dimensional characteristics.

The tool holder 36 is normally biased in a direction to move the blades into cutting position by means of an elliptical spring 55 which is looped over the end 43 of the T-shaped head, and diametrically on the other side of the shaft 15 over a block 56 carried by an adjusting screw 57 having threaded engagement with a projecting bracket 58 carried by the plate 31. The screw 57 is utilized to vary the tension of the spring 55, and to indicate the setting of the screw, the adjacent surface of the plate 31 may be provided with a series of numbered graduations 59 with which the adjacent head end surface of the screw may be aligned in order to obtain different tensions of the spring.

Provision is also made for regulating the cutting position of the blades of the blade assembly. For such purpose, the blade holder 46 is provided with a side lug 60 (FIG. 1) in which there is threadedly mounted an adjusting screw 61, the lowermost ends of this screw being adapted to abut against a fixed bracket 62 shown as being secured to the plate 31 as by cap screws 63. The screw 61 may be held in adjusted position as by a lock nut 64.

Various means may be provided for moving the blade holder radially outwardly to carry the blades to a non-cutting position. This may be accomplished by a mechanical linkage or by electrically controlled means. For purposes of illustration, electrical means are utilized as exemplified by a solenoid 65 having an armature plunger 66 which engages the arm 44 of the T-shaped head 42. Energization of the solenoid operates to move the plunger 66 outwardly, thus moving the blade assembly radially outwardly away from the cable in the passage 27. The solenoid is energizable through circuit conductors 67 and 68 having connection respectively with slip rings 69 and 70 carried by an insulating collar 71 secured to the shaft 15 as by a set screw 72 or other means. The slip rings are operatively associated with spring contactors or brushes 73, 74 supported on a fixed bracket 75 secured to the base plate 10, the brushes being connected to supply conductors 76 and 77.

The shaft 15 and the components carried thereby are rotated by means of the rotor structure 17 when a fluid such as air under pressure is projected against the vanes 19 from a nozzle (not shown) supplied through an air line 78, as shown in FIG. 1. The speed of rotation of the shaft is readily controlled by varying the fluid pressure.

As illustrative of the cutting operation accomplished by means of the cutter apparatus described above, there is shown in FIG. 3 a fragmentary enlarge section of a coaxial cable having an inner conductor 79, an inner insulating sleeve 80 which is surrounded by an outer conducting sheath 81, and an outer insulating jacket 82. In the operation of the cutter apparatus, means to be subsequently described provide for intermittently feeding the cable axially through the insert 25 a predetermined distance depending upon the ultimate cable lengths desired. Depending upon these lengths, the cable is terminated with respect to its movement and, while stationary, the cutting operation is performed in which the insulation covering and outer conductor are severed. The cable lengths are marked by scoring the outer surface of the jacket. During this operation, it will be observed that the central conductor remains intact and is not severed. The cable may then be wound upon a take-up reel for storage until such time as it may be used by an assembler. As the cable is unreeled, it may be cut at the scored points and the previously cut insulation and outer conductor portions stripped so as to expose the inner and outer conductors and permit electrical connection thereto or the mounting of terminals thereon.

As diagrammatically illustrated in FIG. 3, the severing point for obtaining the desired cable lengths is indicated by the point 49 which scores the surface of the cable jacket 82. Adjacent this point and spaced therefrom a distance $a$, the blade 5 will cut up to the outer surface of the inner conductor 79. At a spaced distance $b$, the cutting blade 51 will cut through the outer conductor sheath 81 up to the outer surface of the insulation 80. Moreover, at a distance $c$ from the blade 51, the blade 53 will cut through the insulation jacket 82 up to the outer surface of the outer conductor sheath 81. At the final cutting operation, when the assembler or user cuts through the cable at the point indicated by the point 49, the previously cut portions may be stripped so as to leave the length of central conductor 79 bare for the distance $a$, and the outer conductor sheath 81 bare for the distance $c$, these bared surfaces of the conductors being separated by an insulating space $b$.

Referring now to FIG. 4, a cable 83 is fed from a supply reel 84 through the cutter apparatus previously described, the cable entering the insert 25 and leaving the cutter where it is wound upon a take-up or storage reel 85 driven by a small motor 86 through a friction clutch 87. A friction drag 88' is applied to the supply reel 84 in order to prevent its unwinding too freely.

The measuring and feeding mechanism are broadly disclosed in FIG. 4 as comprising a reversibly propelled carriage 88 which is controlled in its movement between preset limits as determined by a fixed stop 89 and an adjustable stop 90. The carriage 88 supports a cable grip 91 which is adapted to grip the cable and move it in a feeding direction for determined cable length controlled by the spacing between the adjustable stop 90 and the fixed stop 89. Upon reaching the fixed stop 89, control equipment as generally indicated at 92 will operate under the control of a limit switch 93 at the fixed stop to release the grip 91 and actuate the fixed grip 94 to hold the cable against movement during the cutting operation. During feeding movement of the cable by movement of the carriage 88, the take-up reel 85 operates, and at this time the control will energize the solenoid 65 so as to actuate the cutter blades to non-cutting position. The control further acts through a timer as generally indicated at 95, this timer determining the number of revolutions of the cutters. The carriage 88 is motivated in a reversed direction of travel towards the adjustable stop 90, and upon reaching its limit of movement actuates a limit switch 96 to reverse the direction of travel of the carriage 88 and repeat the feeding operation. The cutter, feeding mechanism and control are all arranged for automatic operation.

Figure 5:
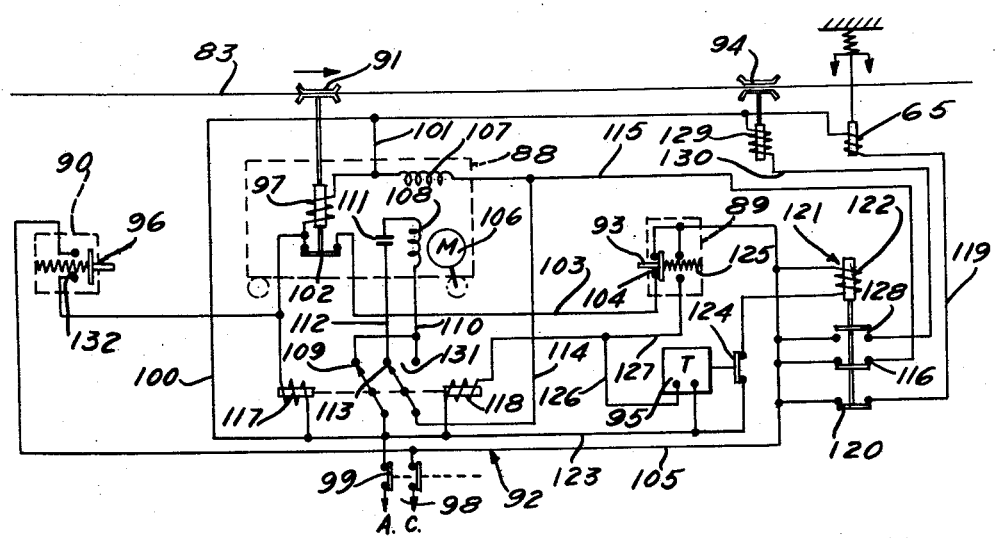
FIG. 5 is a wiring diagram schematically illustrating the electric control for the measuring and cutting mechanisms.

Referring now to FIG. 5, the control will be more specifically explained by reference to the schematic wiring diagram. The cable is shown as being moved in a feed direction by the movable grip 91 which is in closed position, this grip being actuated by an operating coil 97 which is energized from an A.C. electrical source 98, a main line contactor 99 having its contacts in closed position, the operating coil 97 being fed from one side of the circuit through a conductor 100, conductor 101 to one terminal of the coil 97, from the other terminal of this coil through holding contacts 102, conductor 103, limit switch closed contacts 104, and thence by conductor 105 back to the other side of the circuit.

The carriage 88 is moved in a feeding direction of the cable 83 by means of a propelling motor 106 having a field winding 107, and a reversible field winding 108. During movement of the carriage in this direction, the motor is energized through a circuit as follows: From one side of the electrical source through closed contacts 109, conductor 110 to one side of field winding 108, thence through a capacitor 111, conductor 112, thence through closed contacts 113, conductor 114, conductor 115, closed contacts 116, and then by conductor 105 back to the other side of the supply source. The field coil 107 of the motor is energized through a circuit as follows: From one side of the electrical source, through conductor 100, conductor 101 to one side of the field coil 107, from the other side through conductor 115, closed contacts 116, and then by conductor 105 back to the other side of the electrical source.

The contacts 109 and 113 are controlled by throw-over operating coils 117 and 118 which are selectively energizable to control the direction of operation of the motor 106. During the feeding operation of the carriage, the solenoid 65 is energized to retain the cutter blades in non-cutting position. The solenoid 65 is energized through a circuit as follows: from one side of the electrical source, through conductor 100 to one terminal of the solenoid coil, from the other terminal through conductor 119, closed contacts 120 and then by conductor 105 back to the other side of the electrical source.

During this operation, the contacts 116 and 120, which are in a master relay 121 are under control of an operating coil 122. The operating coil 122 at this time is energized through a circuit as follows: from one side of the electrical source through conductor 123, the closed contacts 124 of timer 95, to one terminal of the coil 122, from the other terminal of coil 122 by conductor 105 back to the other side of the electrical source.

With the control as thus described, the carriage 88 will move in a feeding direction until the carriage strikes the limit switch 93 with the result that the contacts 104 will move into open position and contacts 125 will be closed. Opening of the contacts 104 will deenergize the operating coil 97 and open the cable grip 91. At the same time, closure of contacts 125 will energize the timer 95 so that it will open its contacts 124. The timer will be energized through a circuit as follows: From one side of the electrical source through conductor 123 to one terminal of the timer, from the other terminal of the timer through conductor 126, conductor 127, closed contacts 125, and thence by conductor 105 back to the other side of the electrical source.

Opening of the contacts 124 will deenergize the master relay, whereupon the contacts 116 will open and deenergize the fields of the motor 106 to terminate movement of the carriage 88. Contacts 120 also open to deenergize solenoid 65 so that the spring may bias the cutters into cutting position. Upon deenergization of the master relay 121, contacts 128 thereof will be closed to complete an energizing circuit through an operating coil 129 for the fixed grip 94 as follows: From one side of the electrical source through conductor 100 to one terminal of coil 129, from the other terminal through a conductor 130, closed contacts 128, and thence by conductor 105 back to the other side of the electrical source.

The number of revolutions during which the cutting blades are in cutting position is determined by the timer 95. The timing interval thus determines the number of revolutions of the blades during the cutting operation. At the end of this interval the timer operates to again close its contacts 124.

However, upon closure of the contacts 125 as previously explained, a circuit is established through the operating coil 118 which actuates the contacts 109 and 113 to open position and actuates this throw-over switch to closed contacts 113 and 131 so as to reverse the connection on field coil 108 of the motor. Now, when the timer 95 operates at the end of the timing interval to close its contacts 124, the master relay will again be energized, and upon closure of contacts 116 will start the motor 106 operation in a reversed direction to carry the carriage towards the stop 90. At the same time, closure of contacts 120 will energize the solenoid 65 to terminate the cutting operation.

As soon as the carriage 88 reaches the stop 90, the limit switch 96 will be actuated to close its contacts 132 whereupon the operating coils 97 and 117 will be simultaneously energized to close the cable grip 91 and interlock the energizing circuit in closed position, and operate the contacts so as to close contacts 109 and 113 again and reverse the direction of movement of the carriage 88 in another cycle of feeding direction.

From the foregoing description it will be apparent that the described invention accomplished the stated objects.

Various modifications may suggest themselves to those skilled in the art without departing from the spirit of my invention, and, hence, I do not wish to be restricted to the specific forms shown or uses mentioned, except to the extent indicated in the appended claims.

I claim:

1. Cable cutting apparatus, comprising: a rotatably mounted frame having a cable passage axially aligned with its axis of rotation; a plurality of blades spaced axially of said cable passage; a holder for said blades carried by said frame and supported for radial movements to cutting and non-cutting positions with respect to a cable in said passage; spring means for moving said holder to carry the blades to a cutting position; electro-magnetic means carried by said frame having an actuating connection with said holder, said means upon energization acting to move said holder to a non-cutting position of said blades; and timing control means for de-energizing said electro-magnetic means for a predetermined time interval during rotation of said frame.

2. Cable cutting apparatus, comprising: means forming a cable guide passage; a frame rotatable around said guide passage; cutter blades carried by said frame; spring means for actuating said blades into cutting position with respect to a cable in said passage; means operable to move said blades against said spring to a non-cutting position; a carriage linearly movable in alternate directions between spaced limits; means on said carriage for gripping and moving said cable axially in a feeding direction during movement of said carriage in one direction to one of said limits and when said blades are in non-cutting positions, said gripping means being in non-gripped position during carriage movement in an opposite direction to its other limit; fixed cable gripping means having parts movable to non-gripping relation with respect to said cable and gripping relation with respect to said cable for holding said cable against axial movement; and means operable in response to the carriage reaching its said other limit to move said parts into gripping relation and deactivate said blade moving means to effect a cutting operation upon said frame rotation.

3. Cable cutting apparatus, comprising: means forming a cable guide passage; a frame rotatable around said guide passage; movably mounted cutter blades carried by said frame; means for actuating said blades into cutting and non-cutting positions with respect to a cable in said passage; a carriage linearly movable in alternate directions between spaced limits; means on said carriage for gripping and moving said cable axially in a feeding direction during movement of said carriage in one direction between said limits and when said blades are in non-cutting positions, said gripping means being in non-gripped position during carriage movement in an opposite direction; means having parts operable to a position for holding said cable against axial movement; and means responsive to movement of said carriage to its limit in said opposite direction for actuating said cable holding means and moving said blades to a cutting position.

4. Cable cutting apparatus, comprising: means forming a cable guide passage; a frame rotatable around said guide passage; movably mounted cutter blades carried by said frame spaced axially of said guide passage; means for actuating said blades into cutting and non-cutting positions with respect to a cable in said passage; a carriage linearly movable in alternate directions between spaced limits; means on said carriage for gripping and moving said cable axially in a feeding direction during movement of said carriage in one direction between said limits and when said blades are in non-cutting positions, said gripping means being in non-gripped position during carriage movement in an opposite direction; means movable to gripped and non-gripped relation with said cable, and in gripped relation holding said cable against axial movement; means responsive to movement of said carriage to its limit in said opposite direction for moving said cable gripping means to its gripped relation and said blades to cutting positions; and timing control means operative after a predetermined timed interval for effecting movement of said cutting blades to non-cutting position.

5. Cable cutting apparatus, comprising means forming a cable guide passage; a frame rotatable around said guide passage; movably mounted cutter blades carried by said frame; means for actuating said blades into cutting and non-cutting positions with respect to a cable in said passage; a carriage supported for movement in opposite directions between spaced limits; electro-magnetic power means for driving said carriage; control means for said power means including switching elements at said limits for reversing the driving direction of said power means; means on said carriage operable to grip and feed said cable towards said cutters during one direction of movement of the carriage and when said cutter blades are in non-cutting positions; means having parts operable to a position for holding said cable against axial movement; and means operable in response to movement of said carriage to its limit in said opposite direction for actuating said holding means and moving said blades into cutting position.

6. Cable cutting apparatus, comprising: means forming a cable guide passage; a frame rotatable around said guide passage; cutter blades carried by said frame; spring means for actuating said blades into a cutting position with respect to a cable in said passage; electro-magnetic means energizable to move said blades against said spring to a non-cutting position; a carriage alternately movable in a cable feeding direction and in an opposite non-feeding direction between spaced limits corresponding to the length of cable to be cut; electrically actuated means on said carriage operable upon energization to grip said cable and move it in response to carriage movement in said cable feeding direction; fixed electrically actuated means operable upon energization to grip said cable and hold it against axial movement; and control means operable by said carriage at the limit of its feeding movement for energizing the fixed cable gripping means and de-energizing the electro-magnetic means.

7. Cable cutting apparatus, comprising: means forming a cable guide passage; a frame rotatable around said guide passage; cutter blades carried by said frame; spring means for actuating said blades into a cutting position with respect to a cable in said passage; electro-magnetic means energizable to move said blades against said spring to a non-cutting position; a carriage alternately movable in a cable feeding direction and in an opposite non-feeding direction between spaced limits corresponding to the length of cable to be cut; electrically actuated means on said carriage operable upon energization to grip said cable and move it in response to carriage movement in said cable feeding direction; fixed electrically actuated means operable upon energization to grip said cable and hold it against axial movement; control means operable by said carriage at the limit of its non-feeding movement for energizing the cable gripping means on said carriage; and control means operable by said carriage at the limit of its feeding movement for de-energizing the cable gripping means on said carriage and said electro-magnetic means, and for energizing the fixed cable gripping means.

8. Cable cutting apparatus, comprising: means forming a cable guide passage; a frame rotatable around said guide passage; cutter blades carried by said frame; spring means for actuating said blades into a cutting position with respect to a cable in said passage; electro-magnetic means energizable to move said blades against said spring to a non-cutting position; a carriage alternately movable in a cable feeding direction and in an opposite non-feeding direction between spaced limits corresponding to the length of cable to be cut; electrically actuated means on said carriage operable upon energization to grip said cable and move it in response to carriage movement in said cable feeding direction; fixed electrically actuated means operable upon energization to grip said cable and hold it against axial movement; control means operable by said carriage at the limit of its feeding movement for energizing the fixed cable gripping means and de-energizing the electro-magnetic means; and means for re-energizing said electro-magnetic means after a predetermined time interval.

9. Cable cutting apparatus, comprising: a rotatably mounted frame having a cable passage axially aligned with its axis of rotation; a plurality of blades spaced axially of said cable passage; a holder for said blades carried by said frame and supported for radial movements to cutting and non-cutting positions with respect to a cable in said passage; spring means for moving said holder to cutting position; and electro-magnetic means carried by said frame energizable during rotation thereof to move said holder to a non-cutting position.

References Cited in the file of this patent

UNITED STATES PATENTS

| 713,333 | McDaniels | Nov. 11, 1902 |
| 1,284,652 | Gorton | Nov. 12, 1918 |
| 1,835,398 | Huston | Dec. 8, 1931 |
| 2,112,396 | Corrigan | Mar. 29, 1938 |
| 2,279,046 | Kearney | Apr. 7, 1942 |
| 2,346,314 | Lembitz | Apr. 11, 1944 |
| 2,641,046 | Motch | June 9, 1953 |
| 2,655,066 | Siegerist | Oct. 13, 1953 |
| 2,809,697 | Menzies | Oct. 15, 1957 |